(12) United States Patent
Han et al.

(10) Patent No.: US 12,142,922 B2
(45) Date of Patent: Nov. 12, 2024

(54) TECHNIQUES FOR LIMITING POWER USING AN ACTIVE FRONT END

(71) Applicant: Caterpillar Inc., Peoria, IL (US)

(72) Inventors: Seok-hee Han, Dunlap, IL (US); Jesse R. Gerdes, Dunlap, IL (US); Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 17/901,585

(22) Filed: Sep. 1, 2022

(65) Prior Publication Data

US 2024/0079876 A1    Mar. 7, 2024

(51) Int. Cl.
*H02J 3/16* (2006.01)
*H02J 7/00* (2006.01)
*H02J 7/34* (2006.01)

(52) U.S. Cl.
CPC .......... *H02J 3/16* (2013.01); *H02J 7/007182* (2020.01); *H02J 7/345* (2013.01); *H02J 2207/50* (2020.01)

(58) Field of Classification Search
CPC ........ H02J 3/16; H02J 7/007812; H02J 7/345; H02J 2207/50
See application file for complete search history.

(56) References Cited

U.S. PATENT DOCUMENTS

| | | | |
|---|---|---|---|
| 9,042,141 B2 | 5/2015 | Yu et al. | |
| 9,213,387 B2 | 12/2015 | King et al. | |
| 10,833,532 B2 | 11/2020 | Taft | |
| 10,989,180 B2 | 4/2021 | Yeung et al. | |
| 11,289,910 B2 | 3/2022 | Zimmanck | |
| 2004/0146098 A1* | 7/2004 | Eliezer | H03C 3/0966 332/128 |
| 2008/0071427 A1* | 3/2008 | Szepek | F02C 9/46 60/773 |
| 2008/0212344 A1 | 9/2008 | Furem | |
| 2012/0267952 A1* | 10/2012 | Ballatine | H02J 7/34 307/26 |

(Continued)

FOREIGN PATENT DOCUMENTS

| | | |
|---|---|---|
| CN | 103116074 | 9/2016 |
| CN | 111835028 | 10/2020 |

(Continued)

OTHER PUBLICATIONS

Zuo, Yihui, "Performance assessment of grid-forming and grid-following converter-interfaced battery energy storage systems on frequency regulation in low-inertia power grids", Sustainable Energy, Grids and Networks 27, 100496, (2021), 11 pgs.

*Primary Examiner* — Rafael O De Leon Domenech (57) ABSTRACT

Techniques to limit electrical power when forming an electrical grid using an active front end unit having an inverter that is coupled to a capacitor (and inductor) that is coupled to an electrical grid. For example, to limit power, the integration of a commanded frequency of the system can be limited to be within a specified phase delta of a measured phase angle of an electrical grid voltage vector. The calculation from power limit to phase delta can be done when the phase of the electrical grid voltage vector has been determined to be accurate and is calculated based on the measured capacitor voltage, grid voltage, and the estimated voltage drop across the output components of the system.

20 Claims, 3 Drawing Sheets

(56) References Cited

U.S. PATENT DOCUMENTS

| | | | |
|---|---|---|---|
| 2016/0313716 A1* | 10/2016 | Chen | H02J 4/00 |
| 2017/0005473 A1* | 1/2017 | Somani | H02J 3/381 |
| 2019/0123560 A1* | 4/2019 | Rozman | H02J 7/345 |
| 2019/0386593 A1* | 12/2019 | Zhong | G06F 30/20 |
| 2020/0151371 A1 | 5/2020 | Freunek | |
| 2020/0321783 A1* | 10/2020 | Corradin | H02J 13/00002 |
| 2021/0006085 A1* | 1/2021 | Berggren | H02J 3/36 |
| 2021/0408793 A1 | 12/2021 | Unru et al. | |

FOREIGN PATENT DOCUMENTS

| | | |
|---|---|---|
| CN | 113765149 | 12/2021 |
| CN | 114280363 | 4/2022 |

* cited by examiner

TECHNIQUES FOR LIMITING POWER USING AN ACTIVE FRONT END

TECHNICAL FIELD

This document relates generally to electrical power equipment and more specifically to an energy storage system inverter apparatus.

BACKGROUND

While forming an electrical grid and sharing power between multiple sources utilizing a frequency droop method, the system may not be able to accurately limit power to meet the device limitations. This is because even though frequency can be altered to control power, it is actually voltage phase and magnitude, which is the integration of the frequency, and specifically the phase difference between the commanded unit's voltage vector and the grid voltage vector, that controls power generation.

CN111835028 discloses a microgrid inverter control method based on a virtual synchronous generator. In order to improve the adaptability of the virtual synchronous generator under different operating conditions, the method mainly comprises the following 3 steps: 1) by using a second-order model of the synchronous generator for reference, simulating the inertia and the damping of the synchronous generator, and providing a control structure and an implementation principle of the virtual synchronous generator; 2) aiming at the problem of uneven reactive power distribution in a multi-machine parallel system, a reactive power control method based on voltage compensation is provided; 3) in order to ensure that the virtual synchronous generator can be smoothly and seamlessly switched in a dual mode, a pre-synchronization control strategy is provided. The parallel connection and off-network dual-mode seamless switching of the virtual synchronous generators is realized while the parallel connection and the uniform division of the virtual synchronous generators are ensured. The inverter controlled by the virtual synchronous generator has the technical characteristics of rotational inertia, damping characteristic, frequency and voltage modulation characteristic and general grid connection and disconnection.

SUMMARY

This disclosure describes techniques to limit electrical power when forming an electrical grid using an active front end unit having an inverter that is coupled to a capacitor (and inductor) that is coupled to an electrical grid. For example, to limit power, the integration of a commanded frequency of the system can be limited to be within a specified phase delta of a measured phase angle of an electrical grid voltage vector. The calculation from power limit to phase delta can be done when the phase of the electrical grid voltage vector has been determined to be accurate and is calculated based on the measured capacitor voltage, grid voltage, and the estimated voltage drop across the output components of the system.

In an aspect, this disclosure is directed to a method of limiting electrical power using an active front end unit having an inverter, wherein an output of the active front end unit is coupled to a capacitor that is coupled to an electrical grid, wherein the active front end unit includes a frequency droop control mode, the method comprising: during the frequency droop control mode: determining an inverter command frequency using a nominal frequency and a droop frequency; determining, using the inverter command frequency, a representation of an angle of a voltage applied to the capacitor; determining, using a representation of an angle of a voltage of the electrical grid, a limit of the representation of the angle of the voltage applied to the capacitor; and adjusting, using the determined limit, the representation of the angle of the voltage applied to the capacitor.

In another aspect, this disclosure is directed to an active front end unit having a frequency droop control mode, the active front end unit including an inverter, wherein an output of the active front end unit is coupled to a capacitor that is coupled to an electrical grid, the active front end unit comprising: the inverter; and a control unit coupled to the inverter and configured to perform operations comprising: during the frequency droop control mode: determining an inverter command frequency using a nominal frequency and a droop frequency; determining, using the inverter command frequency, a representation of an angle of a voltage applied to the capacitor; determining, using a representation of an angle of a voltage of the electrical grid, a limit of the representation of the angle of the voltage applied to the capacitor; and adjusting, using the determined limit, the representation of the angle of the voltage applied to the capacitor.

In yet another aspect, this disclosure is directed to a An active front end unit having a frequency droop control mode, the active front end unit including an inverter, wherein an output of the active front end unit is coupled to a capacitor that is coupled to an electrical grid, the active front end unit comprising: the inverter; and a control unit coupled to the inverter and configured to perform operations comprising: during the frequency droop control mode: determining an inverter command frequency using a nominal frequency and a droop frequency; integrating the inverter command frequency to determine the representation of an angle of the voltage applied to the capacitor; determining, using a representation of an angle of a voltage of the electrical grid, first and second limits of the representation of the angle of the voltage applied to the capacitor; and adjusting, using the determined first and second limits, the representation of the angle of the voltage applied to the capacitor.

DETAILED DESCRIPTION

This disclosure describes techniques to limit electrical power when forming an electrical grid using an active front end unit having an inverter that is coupled to a capacitor (and inductor) that is coupled to an electrical grid. For example, to limit power, the integration of a commanded frequency of the system can be limited to be within a specified phase delta of a measured phase angle of an electrical grid voltage vector. The calculation from power limit to phase delta can be done when the phase of the electrical grid voltage vector has been determined to be accurate and is calculated based on the measured capacitor voltage, grid voltage, and the estimated voltage drop across the output components of the system.

Figure 1:
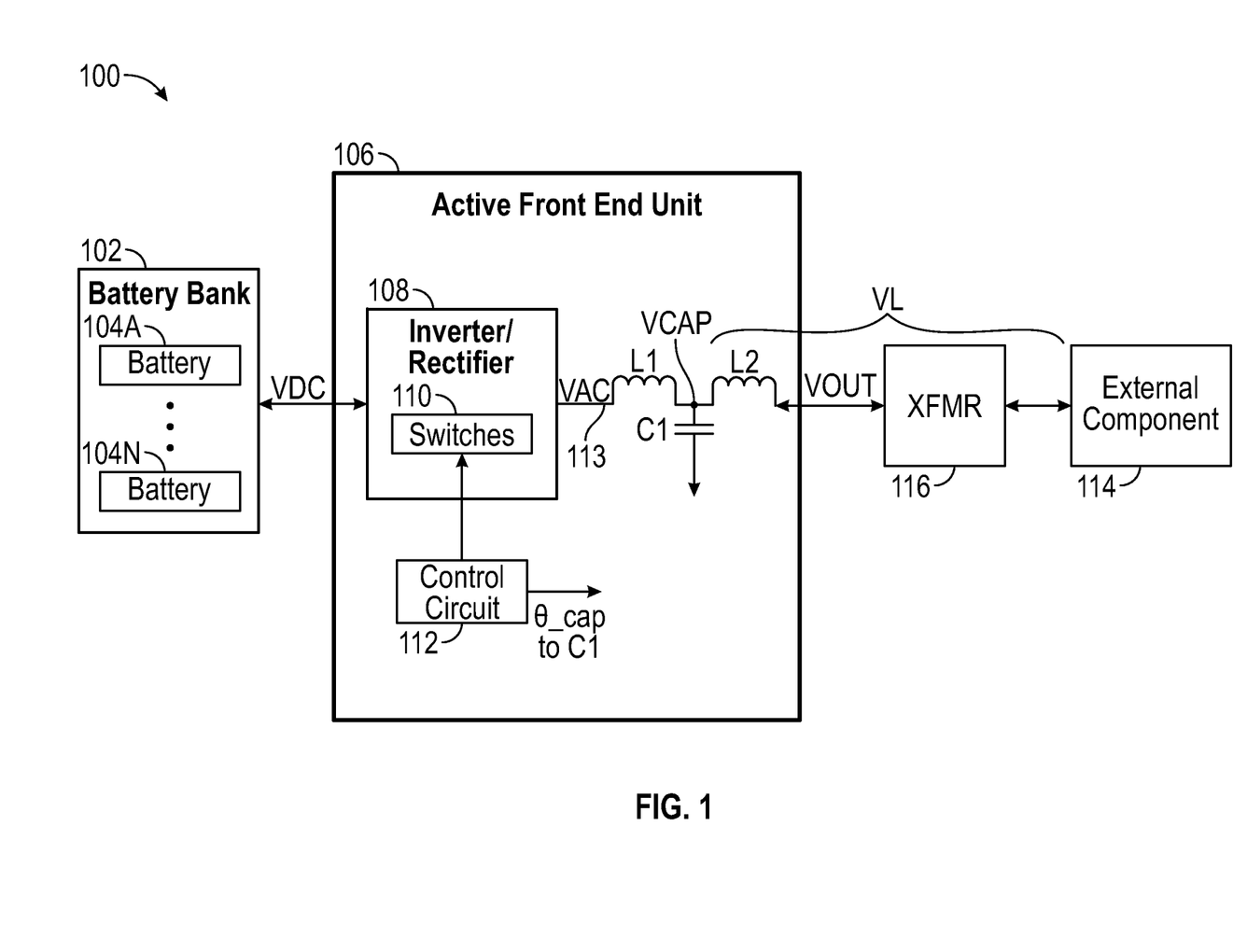
FIG. 1 is a simplified block diagram of an example of a system that can manage power transfer to an external component.

FIG. 1 is a simplified block diagram of an example of a system that can manage power transfer to an external component. The system 100 includes a battery bank 102 having a plurality of batteries 104A-104N, such as coupled in series with one another. The battery bank 102 can provide a DC voltage VDC to an active front end unit 106, which is a bidirectional power unit.

The active front end unit 106 includes an inverter/rectifier circuit 108 that receives the DC voltage VDC and, using a plurality of switches 110 controlled by a control unit 112, the inverter generates and outputs an AC voltage VAC via output 113. The output 113 of the inverter is coupled to a capacitor C1 that is coupled to an electrical grid. The AC voltage VAC can be applied to a filter circuit, such as including inductors L1, L2 and the capacitor C1. The control unit 112 can include one or more processors, controllers, or field programmable gate arrays (FPGA), or a combination thereof.

The active front end unit 106 can generate an output voltage VOUT that can be applied to an external component 114 via a transformer 116. In some embodiments, the external component 114 includes a grid (e.g., an electrical grid or a microgrid). In some embodiments, the external component 114 can include a motor or a generator. Supplying a DC voltage to the inverter/rectifier circuit 108 discharges the batteries 104A-104N in the battery bank 102.

In some examples, such as when the external component 114 is a grid, the active front end unit 106 can receive the AC voltage VAC. The inverter/rectifier circuit 108 can rectify the AC voltage VAC and generate a DC voltage VDC that can charge the batteries 104A-104N in the battery bank 102.

Using various modes, the control unit 112 of the active front end unit 106 can service the grid 114. In a following mode, the active front end unit 106 can sink or source current. In the following mode, the voltage follows the current and can be used when assisting power. The following mode directly controls real and reactive power by controlling different portions of the current vector.

In a firming mode, the active front end unit 106 acts as a voltage source and controls the voltage at an internal node of the system, such as the voltage of the capacitor C1. The firming mode directly controls real and reactive power by controlling different portions of the voltage vector.

The following mode or firming mode techniques use a part of the current or voltage vector, respectively, and controlling a magnitude of that portion of the vector directly provides the power requested.

In a forming mode, the active front end unit 106 can use frequency droop to regulate the output voltage VOUT and regulate the reactive power. The active front end unit 106 applies real power by drooping up or down the frequency, which causes a phase difference θ between the voltage across the capacitor C1 (VCAP) and the grid voltage VOUT. The phase difference θ causes power to flow in one direction or the other.

The frequency droop technique of the forming mode provides an indirect way of controlling real power. With the frequency droop technique, the active front end unit 106 indirectly controls power by controlling the frequency by allowing the voltage frequency to move up or down to change power flow. The frequency droop technique does not directly control power. Rather, the load defines the power output. But, if the active front end unit 106 is overloaded because of a nominal power limit or because the battery bank 102 is drained below a certain state of charge, the system 100 no longer has nominal capability and even a small load can be too much.

The present inventors have recognized a need to limit the power of the active front end unit 106, otherwise the load (external component 114) will receive all the power it wants as long as it does not collapse the system, which does not respect the power limits of the battery bank 102. The power limits can be positive or negative, depending on whether the active front end unit 106 is trying to prop the frequency up by outputting power or trying to bring the frequency down by inputting power. For example, if the battery bank 102 has a high state of charge, the active front end unit 106 does not want to allow the input of a large amount of power.

This disclosure describes, among other things, techniques to keep the system 100 within those power limits (or at least keep the magnitude close to the limits) in modes where the active front end unit 106 is not directly controlling the active power output, such as in the forming mode which uses frequency droop techniques. To limit power, the integration of the commanded frequency of the system can be limited to be close to or within a specified phase delta of the measured phase angle of the grid voltage vector. The calculation from power limit to phase delta can be done when the phase of the grid voltage vector has been determined to be accurate. The calculation can be based on the measured capacitor voltage, the measured grid voltage, and the estimated voltage drop across the output components of the system. As an example and as described in more detail below, the active front end unit 106 can force the voltage at the capacitor C1 (VCAP) to be close to or within limits defined by the angle of the voltage at the grid (VOUT) plus/minus a delta term.

Figure 2:
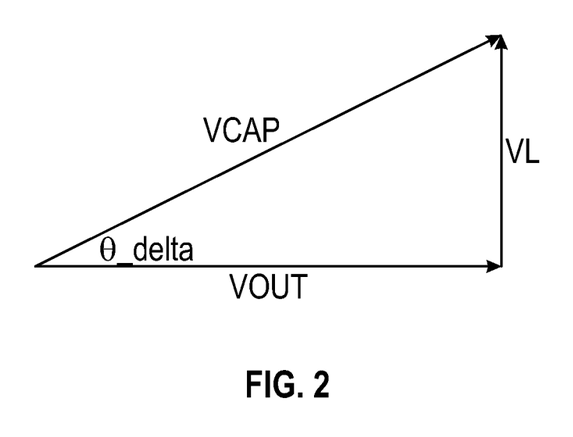
FIG. 2 is a conceptual diagram showing the relationship between various voltage vectors.

FIG. 2 is a conceptual diagram showing the relationship between various voltage vectors. The grid voltage vector is represented by VOUT. The voltage vector across the inductor L2 and the transformer 116 in FIG. 1 is represented by $V_L$. The grid voltage vector VOUT and the vector $V_L$ define the capacitor voltage vector VCAP. The grid voltage vector VOUT and the capacitor voltage vector VCAP are voltages at two different voltage nodes in the system. An angle θ is formed between the grid voltage vector VOUT and the capacitor voltage vector VCAP. If the two voltages are the same, the angle θ is zero and no power flows. Power flow increases as the angle θ between the grid voltage vector VOUT and the capacitor voltage vector VCAP increases. However, it can be desirable to limit the angle θ such as by determining an angle limit θ_delta. The calculation of the angle limit θ_delta is described below using Equations 1-4.

First, a power limit is defined using Equation 1:

$$\text{Power limit} = VOUT \times I_{LOAD} \qquad \text{Equation 1}$$

where VOUT is the measured magnitude of the grid voltage and $I_{LOAD}$ is the load current.

An inductance $L_X$ is calculated using Equation 2:

$$L_X = L_T + L_{XFRM} \qquad \text{Equation 2}$$

where an inductance $L_T$ is the inductance of the inductor L2 in FIG. 1 and the inductance $L_{XFRM}$ is the inductance of the transformer 116 in FIG. 1.

A voltage $V_L$ the inductor L2 in FIG. 1 is calculated using Equation 3:

$$V_L = (2\pi f L_X) \times I_{LOAD} \qquad \text{Equation 3}$$

The angle limit θ_delta is calculated using Equation 4:

$$\theta\_delta = \tan^{-1}\frac{VL}{VOUT} \qquad \text{Equation 4}$$

Both positive and negative power limits θ_delta can be calculated using Equation 1 because these limits may not be symmetric. A positive power limit θ_delta can be calculated and a negative power limit θ_delta can be calculated. In this manner, Equations 1-4 determine an allowed phase difference θ that occur at the positive and negative power limits.

Figure 3:
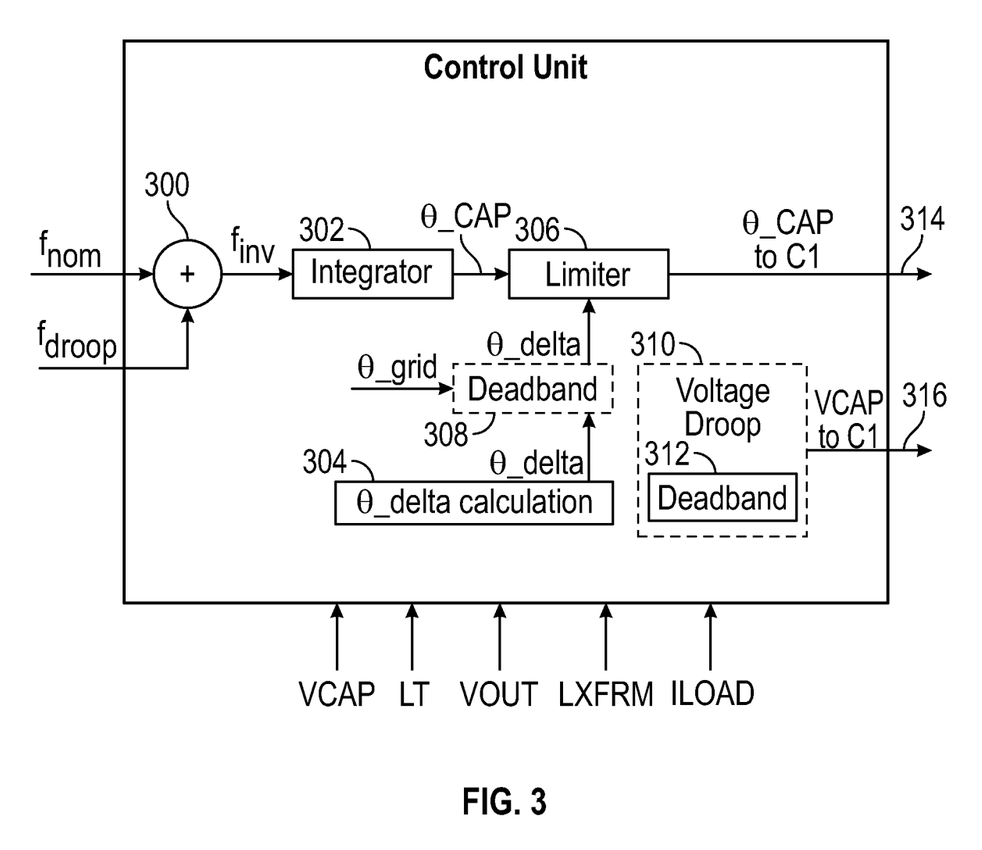
FIG. 3 is a simplified block of an example of a control unit of an active front end unit that can implement various techniques of this disclosure.

FIG. 3 is a simplified block of an example of a control unit of an active front end unit that can implement various techniques of this disclosure. The control unit 112 is configured to receive various inputs. For example, the control unit 112 can receive a nominal frequency $f_{nom}$ and a droop frequency $f_{droop}$, where the nominal frequency $f_{nom}$ is a user-requested frequency, such as 60 Hz in the US or 50 Hz in Europe. The droop frequency $f_{droop}$ is a frequency that is used to offset the nominal frequency based off of a power command to allow the frequency of the system to move up or down depending on the load so that multiple sources can attempt to share the load more evenly. The nominal frequency $f_{nom}$ and the droop frequency $f_{droop}$ are applied to an adder circuit 300 to generate an inverter commanded frequency $f_{inv}$.

The inverter commanded frequency $f_{inv}$ is applied to an integrator circuit 302. Phase angle is the integration of frequency. The integrator circuit 302 receives and integrates the inverter commanded frequency $f_{inv}$ to generate a phase angle θ of a voltage to be applied to the capacitor C1 in FIG. 1. The capacitor voltage vector VCAP is driven by the angle θ.

The control unit 112 receives representations, e.g., scaled versions, of several measured values, including the measured capacitor voltage vector VCAP (including its angle), the measured grid voltage vector VOUT (including its angle), and the measured load current $I_{LOAD}$, which can be measured using various techniques, such as using voltage or current transformers. The control unit 112 can receive representations of the inductance $L_T$ of the inductor L2 in FIG. 1 and the inductance $L_{XFRM}$ of the transformer 116 in FIG. 1. In some examples, representations of the values of the inductances $L_T$ and $L_{XFRM}$ can be stored in a memory circuit that is integral with or coupled to the control unit 112.

Using Equations 1-4 above, the θ_delta calculation circuit 304 determines a representation of the angle limit θ_delta using the representations of VCAP, VOUT, ILOAD, $L_T$ and $L_{XFRM}$ received by the control unit 112. A positive angle limit θ_delta can be calculated as a charge limit and a negative angle limit θ_delta can be calculated as a discharge limit. In this manner, the θ_delta calculation circuit 304 uses a representation of an angle of the grid voltage vector VOUT to determine a positive and/or negative limit θ_delta of the representation of the angle θ of the voltage VCAP applied to the capacitor C1 in FIG. 1. The limits θ_delta are power limits.

The limits θ_delta are applied to a limiter circuit 306. The limiter circuit 306 ensures that the angle θ_cap of the voltage applied to the capacitor C1 in FIG. 1 (which is done by controlling the output 113 of the inverter 108) is close to or within a range of the angle of the grid voltage VOUT plus θ_delta and the angle of the grid voltage VOUT minus θ_delta.

In some examples, the output of the θ_delta calculation circuit 304 can be applied to an optional deadband circuit 308, e.g., a linear dynamic deadband circuit. The deadband circuit 308 can be a configurable frequency deadband with independent positive and negative deadband thresholds. The deadband circuit 308 can compare a difference between the nominal frequency $f_{nom}$ and a frequency $f_{out}$ of the voltage of the electrical grid to a deadband range. The deadband circuit 308 can adjust the determined limit θ_delta of the representation of the angle θ_cap of the voltage applied to the capacitor when the difference between the nominal frequency $f_{nom}$ and the frequency of the voltage of the electrical grid is outside the deadband range. For example, if the frequency is within the deadband, then the output is 0 and the power limits θ_delta are not altered. If the frequency is not within the deadband, then the output is linearly above or below the deadband.

The deadband circuit 308 can multiply the output by a configurable gain such that once outside the deadband, it will alter the power limits slightly. As such, the deadband circuit 308 can change the angles used for the power limits so that it will not allow the frequency to droop as much. The deadband circuit 308 can help manage the amount that the frequency droops as the system goes through an overload condition. For example, the deadband circuit 308 can increase the magnitude of angle power limit to allow some control of the amount of frequency droop that occurs during an overload condition.

As mentioned above, the control unit 112 can determine, using the inverter command frequency, the representation of the angle of the voltage applied to the capacitor by integrating, using the integrator circuit 302 of FIG. 3, the inverter command frequency $f_{inv}$ to determine the representation of the angle of the voltage applied to the capacitor. In some examples, the θ_delta calculation circuit 304 can compare the representation of the angle θ_cap of the voltage applied to the capacitor to a sum of the representation of the angle of the voltage of the electrical grid and the positive power limit θ_delta.

When the representation of the angle θ_cap of the voltage applied to the capacitor is greater than a sum of the representation of the angle of the voltage of the electrical grid and the positive power limit θ_delta, the control unit 112 can pause the integration until the sum of the representation of the angle of the voltage of the electrical grid and the positive power limit θ_delta is greater than the representation of the angle θ_cap of the voltage applied to the capacitor. This allows the angle of the voltage of the electrical grid and the positive power limit θ_delta to catch up and stay near the desired limit. However, when the representation of the angle θ_cap of the voltage applied to the capacitor is less than a sum of the representation of the angle of the voltage of the electrical grid and the positive power limit θ_delta, the control unit 112 can increase a rate of the integration, such as by changing a gain factor. This can allow the voltage of the electrical grid to reach the voltage of the electrical grid more quickly.

In some examples, limiting the angle θ_cap of the voltage applied to the capacitor, as described above, does not limit the power sufficiently. In some such cases, it can be desirable to droop the voltage to limit the power of the system. For example, the control unit 112 can include an optional voltage droop circuit 310. The voltage droop circuit 310 can determine the measured power by multiplying the representation of the measured grid voltage VOUT by the representation of the measured load current $I_{LOAD}$. The voltage droop circuit 310 can compare the measured power to a limit, such as a positive and/or negative limit. In some examples, the positive limit can be a battery charge limit and the negative limit can be a battery discharge limit. The voltage droop circuit 310 can adjust the voltage VCAP applied to the capacitor (which is done by controlling the output 113 of the inverter 108 of FIG. 1) when the measured power exceeds the limit and is outside a power limit deadband range provided by a power limit deadband circuit 312.

Outputs 314 and 316 of the control unit 112 are indirectly coupled to the capacitor C1 of FIG. 1, which is in turn coupled to an electrical grid, e.g., the external component 114 of FIG. 1.

Figure 4:
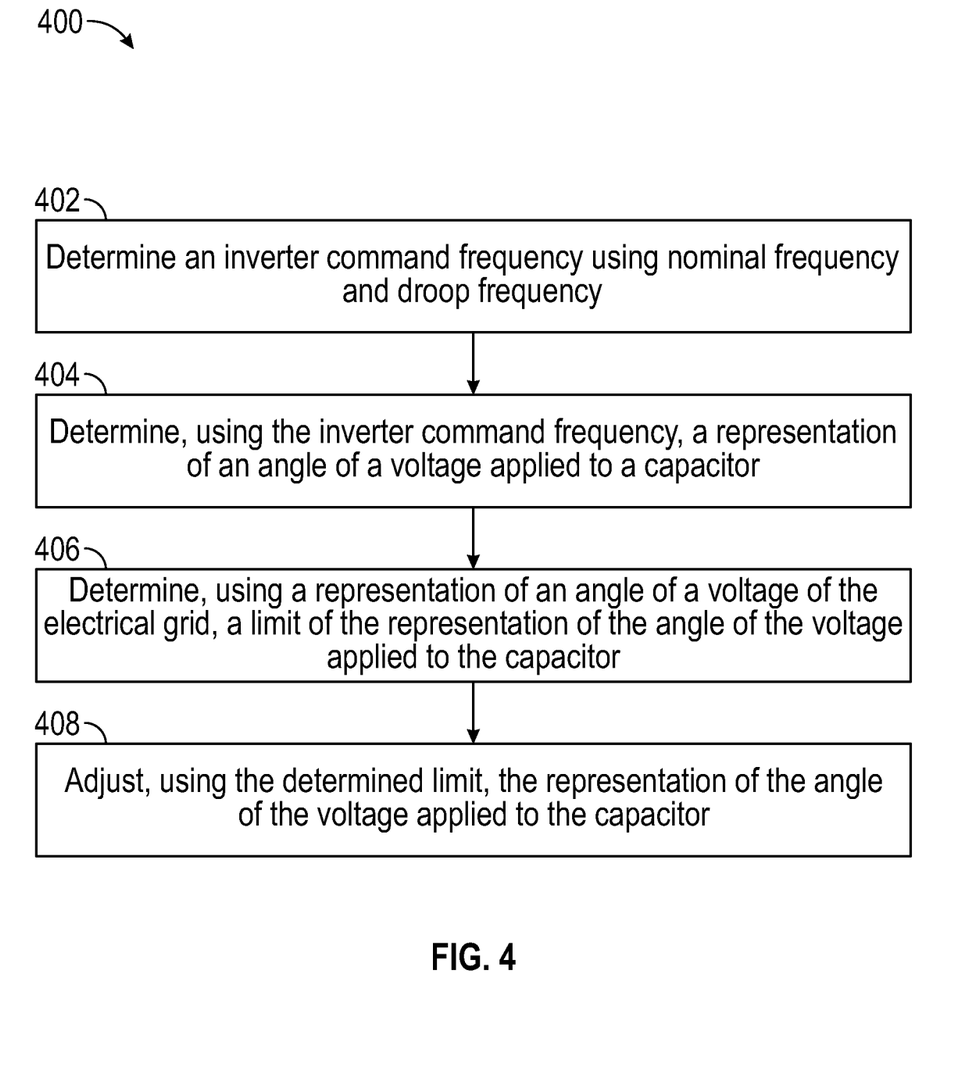
FIG. 4 is a flow diagram of an example of a method of limiting electrical power using an active front end unit having an inverter, where an output of the inverter is coupled to a capacitor that is coupled to an electrical grid, where the active front end includes a frequency droop control mode.

FIG. 4 is a flow diagram of an example of a method 400 of limiting electrical power using an active front end unit having an inverter, where an output of the inverter is coupled to a capacitor that is coupled to an electrical grid, where the active front end includes a frequency droop control mode.

During the frequency droop mode, the control unit 112 can perform various operations, such as shown in blocks 402-408 of the method 400. At block 402, the method 400 can include determining an inverter command frequency using a nominal frequency and a droop frequency. For example, in FIG. 3, an adder circuit 300 of the control unit 112 can determine an inverter command frequency based on a sum of the nominal frequency $f_{nom}$ and the droop frequency $f_{droop}$.

At block 404, the method 400 can include determining, using the inverter command frequency, a representation of an angle $\theta$ of a voltage applied to the capacitor. For example, the control unit 112 in FIG. 3 can determine the angle $\theta\_cap$ of a voltage applied to the capacitor C1 in FIG. 1. In some examples, this can include integrating, using the integrator circuit 302 in FIG. 3, the inverter command frequency $f_{inv}$ to determine the representation of the angle of the voltage applied to the capacitor.

At block 406, the method 400 can include determining, using a representation of an angle of a voltage of the electrical grid, a limit $\theta\_delta$ of the representation of the angle $\theta$ of the voltage applied to the capacitor. For example, the control unit 112 in FIG. 3 can use the grid voltage vector VOUT, which includes an angle $\theta\_grid$ of a voltage of the electrical grid, to determine a limit $\theta\_delta$, such as using delta calculation circuit 304. In some examples, the control unit 112 can determined a first limit $\theta\_delta\_1$, e.g., a positive power limit, and a second limit $\theta\_delta\_2$, e.g., a negative power limit.

At block 408, the method 400 can include adjusting, using the determined limit, the representation of the angle of the voltage applied to the capacitor. For example, the limiter circuit 306 of the control unit 112 in FIG. 3 can adjust the angle $\theta\_cap$ of the voltage applied to the capacitor C1 in FIG. 1 to ensure that it is close to or within a range of the angle of the grid voltage VOUT plus $\theta\_delta$ and the angle of the grid voltage VOUT minus $\theta\_delta$. In examples in which the control unit 112 determine both a first limit $\theta\_delta\_1$ and a second limit $\theta\_delta\_2$, the control unit 112 can adjust, using the determined first limit and the determined second limit, the representation of the angle of voltage applied to the capacitor.

As mentioned above, in some examples, it can be desirable to pause the integration of the inverter command frequency to determine the representation of the angle of the voltage applied to the capacitor. In some such examples, the method 400 can include the control unit 112 comparing the representation of the angle of the voltage applied to the capacitor to a sum of the representation of the angle of the voltage of the electrical grid and the positive power limit.

When the representation of the angle of the voltage applied to the capacitor is greater than a sum of the representation of the angle of the voltage of the electrical grid and the positive power limit, the control unit 112 can pause the integration until the sum of the representation of the angle of the voltage of the electrical grid and the positive power limit is greater than the representation of the angle of the voltage applied to the capacitor.

As mentioned above, in some examples, it can be desirable to increase the rate of integration of the inverter command frequency to determine the representation of the angle of the voltage applied to the capacitor. In some such examples, the method 400 can include the control unit 112 comparing the representation of the angle of the voltage applied to the capacitor to a sum of the representation of the angle of the voltage of the electrical grid and the negative power limit. When the representation of the angle of the voltage applied to the capacitor is less than a sum of the representation of the angle of the voltage of the electrical grid and the negative power limit, the control unit 112 can increase a rate of the integration.

In some examples, it can be desirable to use a deadband. For example, the method 400 can include the control unit 112 comparing a difference between the nominal frequency and a frequency of the voltage of the electrical grid to a deadband range, such as using the deadband circuit 308 of FIG. 3. Then, the control unit 112 can adjust the determined limit $\theta\_delta$ of the representation of the angle $\theta\_cap$ of the voltage applied to the capacitor C1 of FIG. 1 when the difference between the nominal frequency and the frequency of the voltage of the electrical grid is outside the deadband range.

In some examples, it can be desirable to droop the voltage if the adjusting the angle $\theta$ applied to the capacitor C1 is not sufficient. For example, the method 400 can include the control unit 112 comparing a measured power to a limit, such as one or both of a positive and negative limit, e.g., battery charge and discharge limits. Then, the control unit 112 can adjust the voltage applied to the capacitor when the measured power exceeds the limit and is outside a power limit deadband range.

INDUSTRIAL APPLICABILITY

While forming an electrical grid and sharing power between multiple sources utilizing a frequency droop method, the system may not be able to accurately limit power to meet the device limitations. This is because even though frequency can be altered to control power, it is actually phase, which is the integration of the frequency, and specifically the phase difference between the commanded unit's voltage vector and the grid voltage vector, that controls power generation. Without intervention, the load determines the power that the source outputs.

This disclosure describes techniques to limit electrical power using an active front end unit having an inverter that is coupled to a capacitor (and inductor) that is coupled to an electrical grid. For example, to limit power, the integration of a commanded frequency of the system can be limited to be within a specified phase delta of a measured phase angle of an electrical grid voltage vector. The calculation from power limit to phase delta can be done when the phase of the electrical grid voltage vector has been determined to be accurate and is calculated based on the measured capacitor voltage, grid voltage, and the estimated voltage drop across the output components of the system.

The above detailed description is intended to be illustrative, and not restrictive. The scope of the disclosure should, therefore, be determined with references to the appended claims, along with the full scope of equivalents to which such claims are entitled.

The invention claimed is:

1. A method of limiting electrical power using an active front end unit having an inverter, wherein an output of the active front end unit is coupled to a capacitor that is coupled to an electrical grid, wherein the active front end unit includes a frequency droop control mode, the method comprising:

during the frequency droop control mode:
determining an inverter command frequency using a nominal frequency and a droop frequency;
determining, using the inverter command frequency, a representation of an angle of a voltage applied to the capacitor;
determining, using a representation of an angle of a voltage of the electrical grid, a limit of the representation of the angle of the voltage applied to the capacitor; and
adjusting, using the determined limit, the representation of the angle of the voltage applied to the capacitor.

2. The method of claim 1, wherein determining, using the inverter command frequency, the representation of the angle of the voltage applied to the capacitor includes:
integrating the inverter command frequency to determine the representation of the angle of the voltage applied to the capacitor.

3. The method of claim 1, wherein the limit of the angle of the voltage applied to the capacitor is a first limit, the method comprising:
determining, using the representation of the angle of the voltage of the electrical grid, a second limit of the representation of the angle of the voltage applied to the capacitor, and
wherein adjusting, using the determined first limit, the representation of the angle of the voltage applied to the capacitor includes:
adjusting, using the determined first limit and the determined second limit, the representation of the angle of voltage applied to the capacitor.

4. The method of claim 3, wherein the first limit is a positive power limit and the second limit is a negative power limit.

5. The method of claim 4, wherein determining, using the inverter command frequency, the representation of the angle of the voltage applied to the capacitor includes integrating the inverter command frequency to determine the representation of the angle of the voltage applied to the capacitor, the method comprising:
comparing the representation of the angle of the voltage applied to the capacitor to a sum of the representation of the angle of the voltage of the electrical grid and the positive power limit; and
when the representation of the angle of the voltage applied to the capacitor is greater than a sum of the representation of the angle of the voltage of the electrical grid and the positive power limit:
pausing the integration until the sum of the representation of the angle of the voltage of the electrical grid and the positive power limit is greater than the representation of the angle of the voltage applied to the capacitor.

6. The method of claim 4, wherein determining, using the inverter command frequency, the representation of the angle of the voltage applied to the capacitor includes integrating the inverter command frequency to determine the representation of the angle of the voltage applied to the capacitor, the method comprising:
comparing the representation of the angle of the voltage applied to the capacitor to a sum of the representation of the angle of the voltage of the electrical grid and the negative power limit; and
when the representation of the angle of the voltage applied to the capacitor is less than a sum of the representation of the angle of the voltage of the electrical grid and the negative power limit:
increasing a rate of the integration.

7. The method of claim 1, comprising:
comparing a difference between the nominal frequency and a frequency of the voltage of the electrical grid to a deadband range; and
adjusting the determined limit of the representation of the angle of the voltage applied to the capacitor when the difference between the nominal frequency and the frequency of the voltage of the electrical grid is outside the deadband range.

8. The method of claim 1, comprising:
comparing a measured power to a limit; and
adjusting the voltage applied to the capacitor when the measured power exceeds the limit and is outside a power limit deadband range.

9. An active front end unit having a frequency droop control mode, the active front end unit including an inverter, wherein an output of the active front end unit is coupled to a capacitor that is coupled to an electrical grid, the active front end unit comprising:
the inverter; and
a control unit coupled to the inverter and configured to perform operations comprising:
during the frequency droop control mode:
determining an inverter command frequency using a nominal frequency and a droop frequency;
determining, using the inverter command frequency, a representation of an angle of a voltage applied to the capacitor;
determining, using a representation of an angle of a voltage of the electrical grid, a limit of the representation of the angle of the voltage applied to the capacitor; and
adjusting, using the determined limit, the representation of the angle of the voltage applied to the capacitor.

10. The active front end unit of claim 9, wherein the operation of determining, using the inverter command frequency, the representation of the angle of the voltage applied to the capacitor includes the operation of:
integrating the inverter command frequency to determine the representation of the angle of the voltage applied to the capacitor.

11. The active front end unit of claim 9, wherein the limit of the angle of the voltage applied to the capacitor is a first limit, and wherein the control unit is further configured to perform the operations comprising:
determining, using the representation of the angle of the voltage of the electrical grid, a second limit of the representation of the angle of the voltage applied to the capacitor, and
wherein adjusting, using the determined first limit, the representation of the angle of the voltage applied to the capacitor includes:

adjusting, using the determined first limit and the determined second limit, the representation of the angle of voltage applied to the capacitor.

12. The active front end unit of claim 11, wherein the first limit is a positive power limit and the second limit is a negative power limit.

13. The active front end unit of claim 12, wherein the operation of determining, using the inverter command frequency, the representation of the angle of the voltage applied to the capacitor includes integrating the inverter command frequency to determine the representation of the angle of the voltage applied to the capacitor, and wherein the control unit is further configured to perform the operations comprising:
comparing the representation of the angle of the voltage applied to the capacitor to a sum of the representation of the angle of the voltage of the electrical grid and the positive power limit; and
when the representation of the angle of the voltage applied to the capacitor is greater than a sum of the representation of the angle of the voltage of the electrical grid and the positive power limit:
pausing the integration until the sum of the representation of the angle of the voltage of the electrical grid and the positive power limit is greater than the representation of the angle of the voltage applied to the capacitor.

14. The active front end unit of claim 12, wherein the operation of determining, using the inverter command frequency, the representation of the angle of the voltage applied to the capacitor includes integrating the inverter command frequency to determine the representation of the angle of the voltage applied to the capacitor, and wherein the control unit is further configured to perform the operations comprising:
comparing the representation of the angle of the voltage applied to the capacitor to a sum of the representation of the angle of the voltage of the electrical grid and the negative power limit; and
when the representation of the angle of the voltage applied to the capacitor is less than a sum of the representation of the angle of the voltage of the electrical grid and the negative power limit:
increasing a rate of the integration.

15. The active front end unit of claim 9, wherein the control unit is further configured to perform the operations comprising:
comparing a difference between the nominal frequency and a frequency of the voltage of the electrical grid to a deadband range; and
adjusting the determined limit of the representation of the angle of the voltage applied to the capacitor when the difference between the nominal frequency and the frequency of the voltage of the electrical grid is outside the deadband range.

16. The active front end unit of claim 9, wherein the control unit is further configured to perform the operations comprising:
comparing a measured power to a limit; and
adjusting the voltage applied to the capacitor when the measured power exceeds the limit and is outside a power limit deadband range.

17. An active front end unit having a frequency droop control mode, the active front end unit including an inverter, wherein an output of the active front end unit is coupled to a capacitor that is coupled to an electrical grid, the active front end unit comprising:
the inverter; and
a control unit coupled to the inverter and configured to perform operations comprising:
during the frequency droop control mode:
determining an inverter command frequency using a nominal frequency and a droop frequency;
integrating the inverter command frequency to determine the representation of an angle of the voltage applied to the capacitor;
determining, using a representation of an angle of a voltage of the electrical grid, first and second limits of the representation of the angle of the voltage applied to the capacitor; and
adjusting, using the determined first and second limits, the representation of the angle of the voltage applied to the capacitor.

18. The active front end unit of claim 17, wherein the first limit is a positive power limit and the second limit is a negative power limit.

19. The active front end unit of claim 17, wherein the control unit is further configured to perform the operations comprising:
comparing a difference between the nominal frequency and a frequency of the voltage of the electrical grid to a deadband range; and
adjusting the determined limit of the representation of the angle of the voltage applied to the capacitor when the difference between the nominal frequency and the frequency of the voltage of the electrical grid is outside the deadband range.

20. The active front end unit of claim 17, wherein the control unit is further configured to perform the operations comprising:
comparing a measured power to a limit; and
adjusting the voltage applied to the capacitor when the measured power exceeds the limit and is outside a power limit deadband range.

* * * * *